United States Patent [19]

Redford et al.

[11] Patent Number: 5,757,304
[45] Date of Patent: May 26, 1998

[54] REMOTE CONTROL INCLUDING AN INTEGRATED CIRCUIT DIE SUPPORTED BY A PRINTED PUBLICATION AND METHOD FOR FORMING THE REMOTE CONTROL

[75] Inventors: Peter M. Redford, Los Gatos; Donald S. Stern, San Jose, both of Calif.

[73] Assignee: TV Interactive Data Corporation, San Jose, Calif.

[21] Appl. No.: 710,222

[22] Filed: Sep. 13, 1996

[51] Int. Cl.[6] .................................................. G08C 19/12
[52] U.S. Cl. ..................... 341/173; 341/176; 361/748; 361/760
[58] Field of Search ......................... 341/173, 176; 178/18; 345/173, 174; 40/124.01; 434/317; 361/748, 749, 750, 751, 760

[56] References Cited

U.S. PATENT DOCUMENTS

| | | | |
|---|---|---|---|
| 2,900,446 | 8/1959 | McLaughlin et al. | 178/18 |
| 2,907,824 | 10/1959 | Peek, Jr. | 178/18 |
| 3,005,050 | 10/1961 | Koenig, Jr. | 178/20 |
| 3,304,612 | 2/1967 | Proctor et al. | 33/1 |
| 3,308,253 | 3/1967 | Krakinowski | 200/46 |
| 3,522,664 | 8/1970 | Lambright et al. | 35/8 |
| 3,541,541 | 11/1970 | Engelbart | 340/324 |
| 3,591,718 | 7/1971 | Asano | 178/19 |
| 3,593,115 | 7/1971 | Dym et al. | 323/93 |
| 3,662,105 | 5/1972 | Hurst et al. | 178/18 |
| 3,699,439 | 10/1972 | Turner | 324/71 R |
| 3,705,956 | 12/1972 | Dertouzos | 178/18 |
| 3,798,370 | 3/1974 | Hurst | 178/18 |
| 3,806,912 | 4/1974 | Eckert | 340/347 |
| 3,885,097 | 5/1975 | Pobgee | 178/18 |
| 3,906,197 | 9/1975 | Grover | 235/151 |

(List continued on next page.)

FOREIGN PATENT DOCUMENTS

| | | |
|---|---|---|
| 61-137797 | 6/1986 | Japan . |
| 63-213016 | 9/1988 | Japan . |
| 4-104699 | 4/1992 | Japan . |
| 1120526 | 7/1968 | United Kingdom . |

OTHER PUBLICATIONS

"Membrane Switch Products", EECO, 1995, EECO Incorporated, brochure.
"Input Device", Yoshizo Kubo, etc., Official Gazette, Mar. 5, 1985, (1 pg), p. 374.
"Micropad" Brochure, Micropad Limited, 1981, (1 pg).
"Analog Data Tablet", J.F. Hevesi, IBM Technical Disclosure Bulletin, vol. 23, No. 2, Jul. 1980, pp. 666–667.
"Switches" Special Advertising Section, Electronics, Jul. 12, 1984, (1 page), p. sw–6.
"TV Interactive to Unveil [Smart] Paper To Control Computers, Market Products", Dean Takahashi, The Wall Street Journal, Sep. 9, 1996, p. B7D.

*Primary Examiner*—Jeffery Hofsass
*Assistant Examiner*—Andrew Hill
*Attorney, Agent, or Firm*—Skjerven, Morrill, MacPherson, Franklin, & Friel LLP; Omkar K. Suryadevara

[57] ABSTRACT

A remote control (also called "printed publication remote control") for controlling a host device (such as a television or a personal computer) includes: (1) a substrate having a circuit formed of conductive ink (such as carbon based ink) and printed content located adjacent to the conductive ink circuit; (2) an integrated (IC) circuit die supported by (e.g. embedded in) the substrate and connected to the conductive ink circuit; (3) a signal transmitter such as an infrared light emitting diode (LED) connected to the IC die; and (4) a battery connected to the IC die and to the transmitter. The substrate and the printed content together form a printed publication in the form of, for example, a book, a magazine or a catalog. The conductive ink circuit can include a criss-cross grid of conductive lines, with a number of switches being formed at intersections of the grid such that a switch closes when printed content adjacent to the switch is touched. The printed publication remote control allows a user to "touch" printed content and "view" information on the host device in a simple intuitive manner called "touch and view".

33 Claims, 3 Drawing Sheets

U.S. PATENT DOCUMENTS

| | | | |
|---|---|---|---|
| 3,911,215 | 10/1975 | Hurst et al. | 178/18 |
| 3,959,585 | 5/1976 | Mattes et al. | 178/18 |
| 4,022,971 | 5/1977 | Rodgers | 178/19 |
| 4,071,691 | 1/1978 | Pepper, Jr. | 178/19 |
| 4,079,194 | 3/1978 | Kley | 178/18 |
| 4,102,067 | 7/1978 | Tarrant | 40/455 |
| 4,126,760 | 11/1978 | Gordon | 178/18 |
| 4,149,029 | 4/1979 | Pobgee | 178/18 |
| 4,208,648 | 6/1980 | Naumann | 338/99 |
| 4,214,122 | 7/1980 | Kley | 178/18 |
| 4,222,188 | 9/1980 | Tarrant et al. | 40/152.1 |
| 4,286,399 | 9/1981 | Funahashi et al. | 40/124.1 |
| 4,289,925 | 9/1981 | Lambden | 178/18 |
| 4,291,303 | 9/1981 | Cutler et al. | 340/711 |
| 4,293,734 | 10/1981 | Pepper, Jr. | 178/18 |
| 4,299,041 | 11/1981 | Wilson | 40/124.1 |
| 4,313,113 | 1/1982 | Thornburg | 340/709 |
| 4,315,238 | 2/1982 | Eventoff | 338/99 |
| 4,319,078 | 3/1982 | Yokoo et al. | 178/18 |
| 4,363,081 | 12/1982 | Wilbur | 362/98 |
| 4,444,998 | 4/1984 | House | 178/19 |
| 4,455,450 | 6/1984 | Margolin | 178/18 |
| 4,484,026 | 11/1984 | Thornburg | 178/18 |
| 4,497,126 | 2/1985 | Dejean | 40/124.1 |
| 4,564,079 | 1/1986 | Moore et al. | 178/18 |
| 4,570,149 | 2/1986 | Thornburg et al. | 338/114 |
| 4,581,483 | 4/1986 | Ralston | 178/18 |
| 4,587,378 | 5/1986 | Moore | 178/18 |
| 4,607,747 | 8/1986 | Steiner | 206/232 |
| 4,614,266 | 9/1986 | Moorehead | 206/216 |
| 4,703,573 | 11/1987 | Montgomery et al. | 40/455 |
| 4,739,299 | 4/1988 | Eventoff et al. | 338/99 |
| 4,810,992 | 3/1989 | Eventoff | 338/99 |
| 4,866,865 | 9/1989 | Yang | 40/455 |
| 4,884,974 | 12/1989 | DeSmet | 434/317 |
| 4,897,511 | 1/1990 | Itaya et al. | 128/18 |
| 4,963,702 | 10/1990 | Yaniger et al. | 178/18 |
| 4,963,876 | 10/1990 | Sanders et al. | 341/176 |
| 4,990,092 | 2/1991 | Cummings | 434/317 |
| 5,008,497 | 4/1991 | Asher | 178/18 |
| 5,063,698 | 11/1991 | Johnson et al. | 40/124.1 |
| 5,235,328 | 8/1993 | Kurita | 340/825.72 |
| 5,245,171 | 9/1993 | Fox et al. | 235/492 |
| 5,275,285 | 1/1994 | Clegg | 206/449 |
| 5,419,705 | 5/1995 | Sandvik | 434/317 |
| 5,464,092 | 11/1995 | Seeley | 206/217 |
| 5,569,549 | 10/1996 | Redford | 429/1 |
| 5,574,519 | 11/1996 | Manico et al. | 396/429 |
| 5,624,265 | 4/1997 | Redford et al. | 434/307 R |

REMOTE CONTROL INCLUDING AN INTEGRATED CIRCUIT DIE SUPPORTED BY A PRINTED PUBLICATION AND METHOD FOR FORMING THE REMOTE CONTROL

CROSS-REFERENCE TO RELATED APPLICATIONS

This application is related to, and incorporates by reference herein in their entirety the following commonly owned, copending U.S. patent applications:

(1) Ser. No. 08/269,492 filed Jul. 1, 1994, entitled "AN INTERACTIVE BOOK, MAGAZINE AND AUDIO/VIDEO COMPACT DISK BOX" by Peter M. Redford and Donald S. Stern, now U.S. Pat. No. 5,624,265; and (2) Ser. No. 08/405,645 filed Mar. 17, 1995 entitled "A METHOD AND STRUCTURE FOR ATTACHING A BATTERY TO AN ELECTRICAL DEVICE" by Peter M. Redford, now U.S. Pat. No. 5,569,549.

FIELD OF THE INVENTION

This invention relates to a remote control for a host device such as a television or a personal computer. Specifically, this invention relates to a remote control including an integrated circuit die supported by a printed publication and a method for forming the remote control.

BACKGROUND

Remote controls for television (TV) are well known in the art. Conventional TV remote controls have a printed circuit board (PCB) mounted in a stiff box-shaped housing, and have buttons mounted on the housing and connected to circuitry in the PCB. The user can press a button to cause a TV to switch to a desired channel. However, a user must find out the TV programs available for viewing (for example by consulting a TV guide to find a desired program), remember the associated channel number and then switch to the desired channel by pressing the appropriate button on the remote control.

Children's sound books are well known in the art. Such children's sound books have a button which when pressed plays a sound locally from a speaker embedded in the sound book and electrically connected to the button.

SUMMARY OF THE INVENTION

In accordance with this invention, a remote control (also called "printed publication remote control") for controlling a host device (such as a television or a personal computer) includes: (1) a substrate having (a) a circuit (also called "conductive ink circuit") formed of conductive ink (such as carbon based ink) and (b) printed content (such as text or graphics) located adjacent to the circuit; (2) an integrated circuit (IC) die supported by (e.g. embedded in) the substrate and connected to the conductive ink circuit; (3) a signal transmitter (such as an infrared light emitting diode (LED)) connected to the IC die; and (4) a battery connected to the IC die and to the signal transmitter. The substrate (e.g. a sheet of paper, henceforth "paper sheet") and the printed content together form at least a portion of a printed publication that can have a conventional form, for example, a book, a magazine, a postcard or a catalog.

In one embodiment the conductive ink circuit includes a criss-cross grid having a number of switches formed at intersections of the grid such that a switch closes when printed content adjacent to the switch is touched, thereby to allow a user to remotely control the display of a host device, such as a television or a personal computer.

Therefore, a printed publication remote control as described herein allows a user to simply "touch" printed content and "view" associated information on a television in a simple intuitive manner, called "touch and view". Such "touch and view" display of information eliminates the need for a user to consult for example a TV guide and remember the associated channel number if the TV guide's printed content is printed on the substrate as described herein. Such "touch and view" display of information also allows for example a prospective customer to view a music video on a store's television without even opening the shrink wrap of a CD ROM package, merely by touching on the CD ROM's printed content descriptive of the music video.

A printed publication remote control can be substantially flexible if the substrate is formed of, for example, a conventional paper sheet. Alternatively, the printed publication remote control can be substantially stiff if the substrate is formed of, for example, conventional cardboard. The various electrical parts, such as the IC die and the battery can be made sufficiently thin to be embedded into a cardboard substrate or to be mounted between two portions of a paper substrate. A printed publication remote control's substrate can also be formed of materials other than paper, such as mylar which is more durable than paper.

A conductive ink circuit can be formed substantially inexpensively in view of this disclosure, for example by screening or printing conductive ink in a manner well known to a person skilled in the printing arts. A printed publication remote control can be mailed to users via conventional mail delivery systems such as the United States Postal Service (USPS), for example, by bulk mailing using mailing lists in a well known manner. Moreover, a printed publication remote control can be recycled in a manner similar to the recycling of conventional paper products, for example after removal of the IC die, signal transmitter and battery.

DETAILED DESCRIPTION

Figure 1:
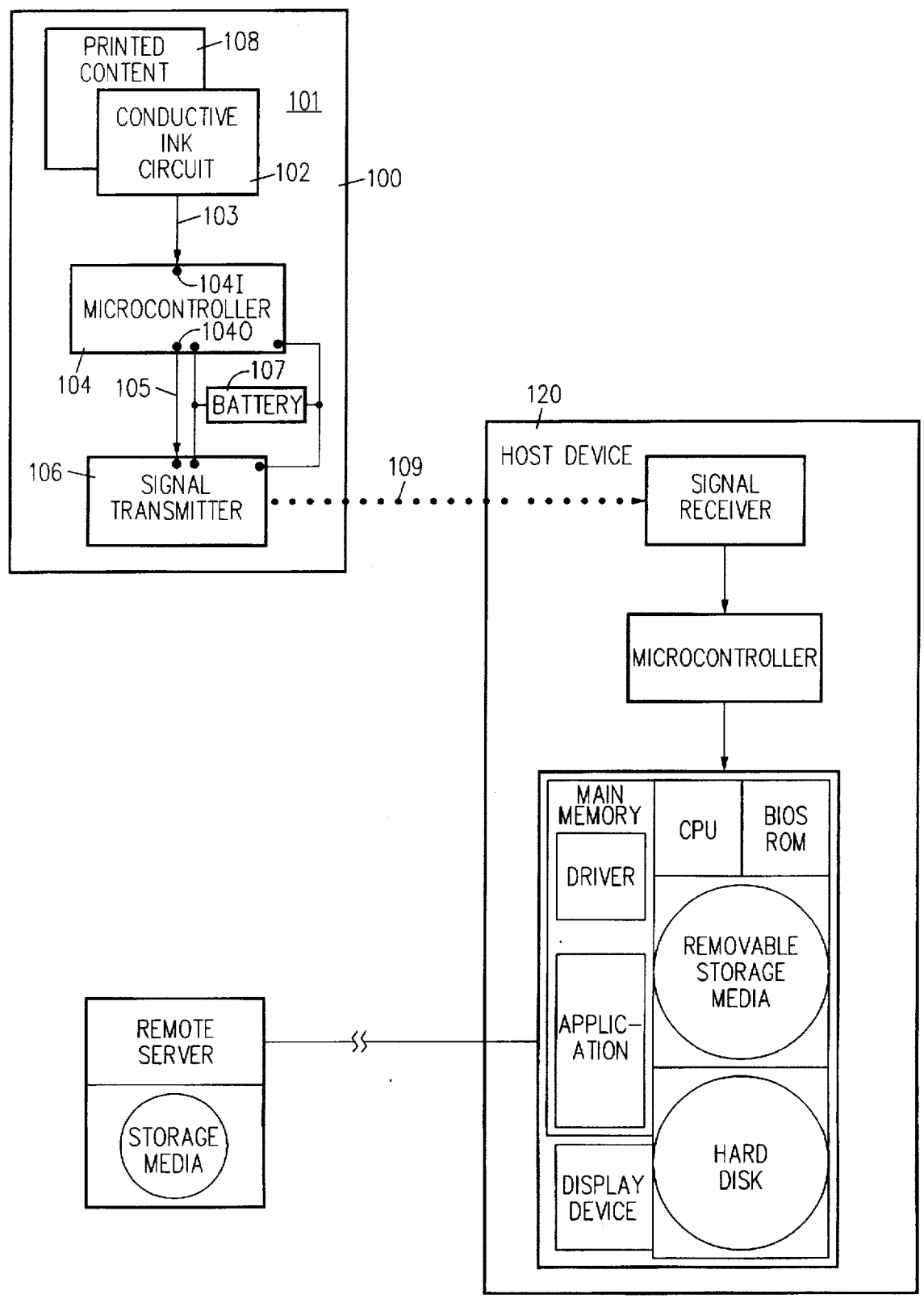
FIG. 1 illustrates, in a block diagram, a printed publication remote control for controlling a host device in accordance with this invention.

In accordance with this invention, a remote control 100 (FIG. 1) includes a substrate 101 having printed content 108 that are together referred to as "printed publication." Remote control 100 can have one or more features of remote controls as described in the above-referenced patent application Ser. No. 08/269,492 (for example, remote control 100 can be a "data button remote control" in the form of a printed publication having printed content visually associated with a data button; see FIGS. 6F–6J and related description).

Substrate 101 is formed of any resilient material, for example, paper (e.g. 60 lb gloss paper sheet available from International Paper Company, 6400 Poplar Avenue, Memphis, Tenn. 38197). Therefore in one embodiment a printed publication has a conventional form, for example, a book, a magazine, a postcard or a catalog. Alternatively, substrate 101 is formed of, e.g. mylar (e.g. 2 mil clear polyester film CLASSICPLUS 2006 available from Flexcon, One Flexcon Industrial Park, Spencer, Mass. 01562). Resiliency of substrate 101 is sufficient to allow substrate 101 to deform elastically when touched and to revert back to the undeformed shape when the touch is released.

Figure 2A:
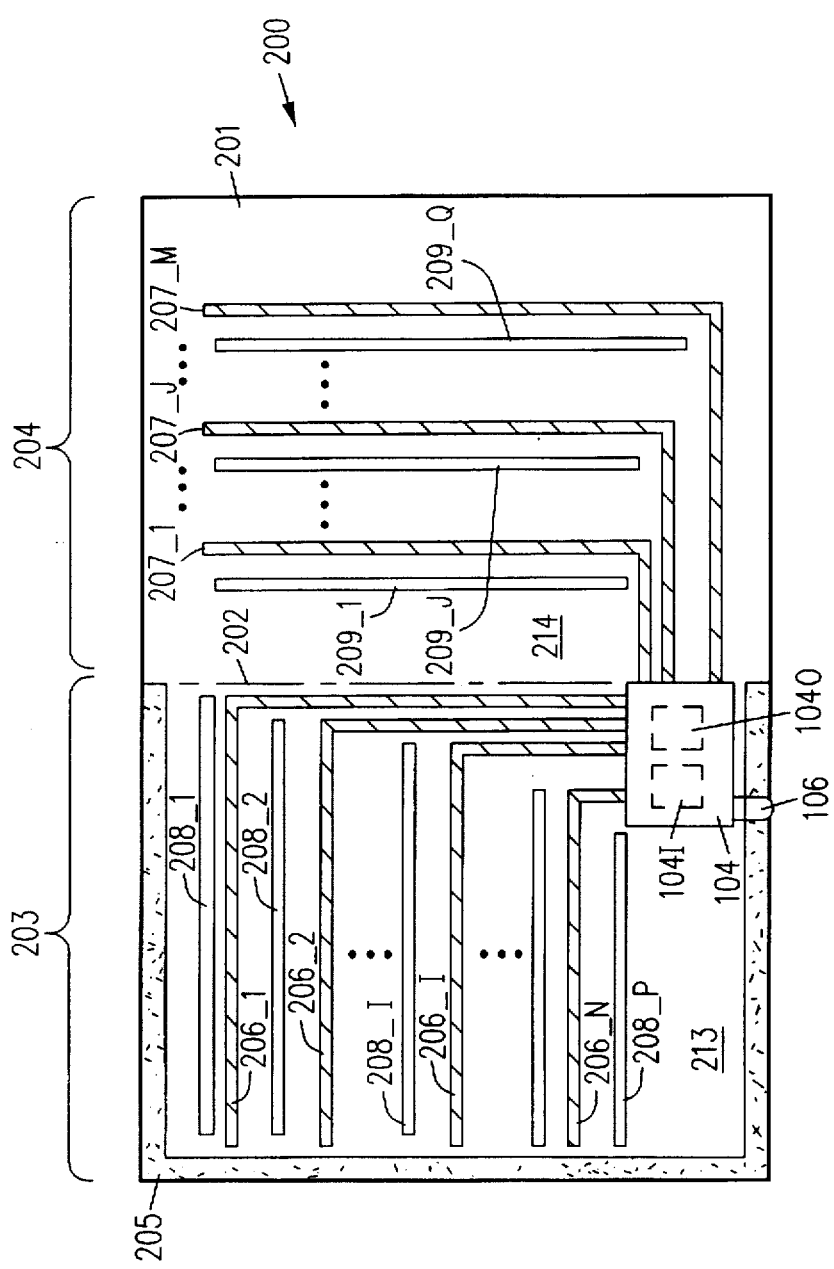
FIGS. 2A and 2B illustrate one embodiment of a printed publication remote control in an open position (during assembly) and a sealed position (after assembly) respectively.

Remote control 100 also includes a circuit 102 formed of conductive ink (e.g. a carbon-based ink such as ELECTRO-DRAG 423SS or a silver-based ink such as ELECTRO-DRAG 478SS, both types of inks being available from Acheson Colloids Company, 1600 Washington Avenue, P.O. Box 611747, Port Huron, Mich. 48061). In accordance with the invention, the conductive ink is resilient such that a line (e.g. line 103) formed of conductive ink flexes elastically with flexure of substrate 101 on being touched (as described below). Circuit 102 can be formed for example by printing (through a drum in one embodiment) or screening (through a stencil in one embodiment) the above-described conductive ink on substrate 101 in a manner obvious to a person skilled in the printing arts in view of this disclosure. Circuit 102 in one embodiment is illustrated in FIG. 2A described below.

Remote control 100 further includes an integrated circuit (IC) die, e.g. microcontroller 104 mounted on substrate 101 by use of an adhesive such that one or more pins, e.g. signal input pin 104I can be connected by a conductive line 103 formed on substrate 101 to conductive ink circuit 102. Microcontroller 104's pins can be connected to substrate 101's conductive lines in a manner well known in the art of IC packaging, e.g. by use of a flip chip assembly (FCA) available from Multichip Assembly, Inc., 4003 North First Street, San Jose, Calif. 95134.

Microcontroller 104 can be, e.g. 20 mils thick (such as microprocessor XC68HC705K0) and can be connected to switches (described below) in one embodiment of circuit 102 as described in the above-referenced U.S. patent application Ser. No. 08/269,492 (see FIG. 7B and related description).

Remote control 100 also includes a signal transmitter 106 that is mounted on substrate 101 (similar to microcontroller 104) and is connected to a signal output pin 104O of microcontroller 104 by a conductive line 105 formed on substrate 101. Signal transmitter 106 can be a photodiode, e.g. NEC SE1003 as described in the above-referenced U.S. patent application Ser. No. 08/269,492. Conductive lines 103 and 105 can be formed of, for example, conductive ink as described above for circuit 102.

Moreover, remote control 100 includes a battery 107 that is detachably attached to substrate 101 in the form of a sticker as described in, for example, the above-referenced U.S. patent application Ser. No. 08/405,645. In an alternative embodiment, battery 107 is permanently mounted on substrate 101, thereby to preclude use of remote control 100 after dissipation of power from battery 107. Battery 107 can be electrically connected to one or more power pins (not labelled) of microcontroller 104 and one or more power pins (also not labelled) of signal transmitter 106 e.g. by conductive lines (not labelled) formed on substrate 101. Battery 107 can be located over and electrically connected to microcontroller 104 as described below.

During operation, remote control 100 transmits, for example, an infrared signal 109 to a host device 120, thereby to control operation of host device 120. Host device 120 can be, for example, a television or a personal computer, as described in the above-referenced U.S. patent application Ser. No. 08/405,645.

Substrate 101 can be formed from a single integral sheet (also called "paper sheet") 201 (FIG. 2) of paper. In one particular embodiment, paper sheet 201 is folded along a center line 202 such that an inner-right portion (also called "first portion") 204 is physically attached to an inner-left portion (also called "second portion") 203 by an adhesive layer 205 located along a periphery of inner-left portion 203. On such folding, microcontroller 104 becomes "embedded" in paper sheet 201, between first portion 204 and second portion 203.

In this embodiment, adhesive layer 205 has a thickness sufficient to keep portions 203 and 204 physically attached to each other, for example, twice the height of longitudinal ridges on sheet 201. The thickness of adhesive layer 205 can be, for example, 3 mils. Adhesive layer 205 can be formed by screening or printing (as described above), and can be formed of any adhesive material, such as ML 25184 available from above-described Acheson Colloids Company.

Figure 2B:
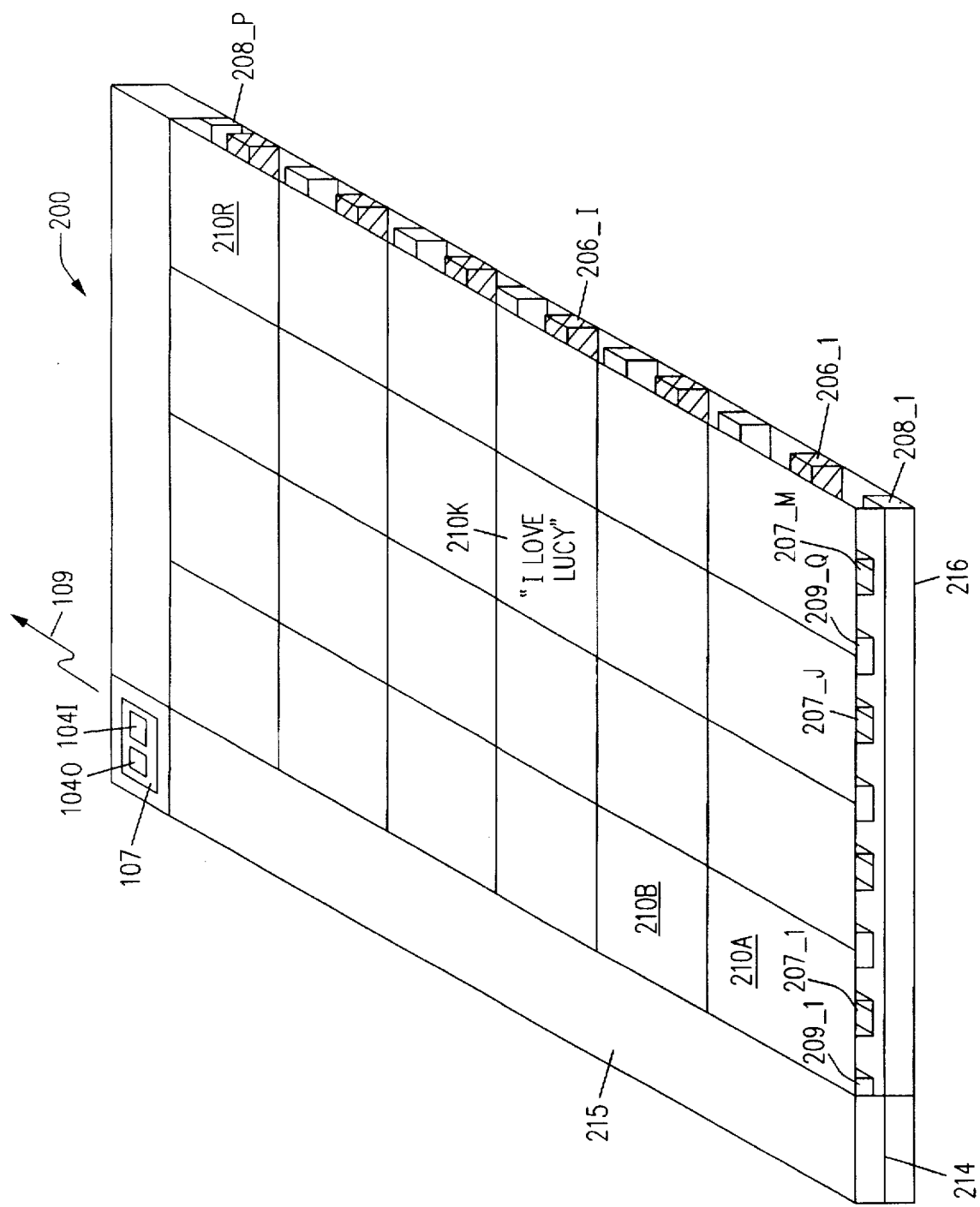

One embodiment of circuit 102 (FIG. 1) includes (see FIG. 2A) a first set of conductive lines $206\_1 \ldots 206\_I \ldots 206\_N$ (where $1 \leq I \leq N$ and N is the number of lines in the first set) that are shaped in the form of alphabet "L", and that are formed parallel to each other on inner-left portion 203 such that vertical portions (not labelled) of conductive lines $206\_1$-$206\_N$ are connected to microcontroller 104. N can be any number, e.g. in one particular embodiment N=6 (FIG. 2B).

Circuit 102 of this embodiment (FIG. 2A) also includes a second set of conductive lines $207\_1 \ldots 207\_J \ldots 207\_M$ (where $1 \leq J \leq M$ and M is the number of lines in the second set) that are also "L" shaped and that are formed parallel to each other on inner-right portion 204 such that horizontal portions (not labelled) of conductive lines $207\_1$-$207\_M$ are connected to microcontroller 104.

Conductive lines $206\_1$-$206\_N$ and $207\_1$-$207\_M$ are located such that when paper sheet 201 is folded along center line 202 (FIG. 2A), a conductive line $206\_I$ (FIG. 2B) in first set of conductive lines $206\_1$-$206\_N$ overlaps a conductive line $207\_J$ in second set of conductive lines $207\_1$-$207\_M$ only in a single area 210K (discussed below), thereby to form a switch at area 210K. Therefore inner-left portion 203 has a horizontal area 213 that is free of conductive ink, to accommodate horizontal portions (not labelled) of conductive lines $207\_1$-$207\_M$ when paper sheet 201 is folded. Similarly, inner-right portion 204 has a vertical area 214 free of conductive ink to accommodate vertical portions (not labelled) of conductive lines $206\_1$-$206\_N$.

Also formed on paper sheet 201 are number of separators such as longitudinal ridges $208\_1\_208\_P$ and $209\_1$-$209\_Q$ that keep conductive lines $206\_1$-$206\_N$ on inner-left portion 203 from touching conductive lines on inner-right portion 204. P and Q can be any numbers, e.g. in this embodiment, P=N+1 and Q=M. Longitudinal ridges $208\_1$-$208\_P$ and $209\_1$-$209\_Q$ can be formed, for example 1 mil higher than the height (for example, 0.5 mil) of conductive lines $206\_1$-$206\_N$ and $207\_1$-$207\_M$. In this particular embodiment, longitudinal ridges $208\_1$-$208\_P$ are formed parallel to, and interdigitate with, horizontal portions (not labelled) of conductive lines $206\_1$-$206\_N$. Similarly longitudinal ridges $209\_1$-$209\_Q$ are formed parallel to and interdigitate with vertical portions (not labelled) of conductive lines $207\_1$-$207\_M$. As noted above, paper sheet 201 is resilient so that sheet 201 deforms elastically when touched and resumes the undeformed shape when touch is released.

Longitudinal ridges $208\_1$-$208\_P$ and $209\_1$-$209\_Q$ can be formed as integral portions of paper sheet 201, and of the same paper material as paper sheet 201, e.g. similar to corrugated paperboard. Alternatively, longitudinal ridges 208_1-208_P and 208_1-208_P can be formed after formation of paper sheet 201, for example by printing or screening a "nonconductive" material, such as a dielectric ink (e.g. a polymer-based ink such as ELECTRODRAG 452SS available from the above-described Acheson Colloids Company).

Longitudinal ridges 208_1-208_P and 209_1-209_Q can also be formed, for example by printing or screening a "conductive" material if the height of ridges 208_1-208_P and 209_1-209_Q is substantially larger (e.g. 2 or 3 times larger) than the height of conductive lines 206_1-206_N and 207_1-207_M. Use of conductive material to form separators has the advantage of using the same step and same material for conductive lines and for separators, thereby reducing cost and eliminating a step of forming separators different from a step of forming conductive lines.

When paper sheet 201 is folded at line 202, separators 208_1-208_P and 209_1-209_Q come together (e.g. contact each other) to form a number of areas (also called "touch areas") 210A–210R (FIG. 2B) that are surrounded by separators 208_1-208_P and 209_1-209_Q. Each of areas 210A–210R covers an overlap of one of conductive lines 206_1-206_N with one of conductive lines such that a switch (not labelled) is formed in the area, for example by lines 206_I and 207_J in area 210K. Therefore, in this embodiment, conductive lines 206_1-206_N and conductive lines 207_1-207_M overlap when sheet 201 is folded to form a criss-cross grid of switches. All such switches are normally kept open due to the above-described difference between the height of conductive lines 206_1-206_N and 207_1-207_M (FIB. 2B), and the height of separators 208A–208P and 209_1-209_Q around the switches.

Such switches are accessible to the user at an outer-right portion 215 located opposite and parallel to inner-right portion 204. In this embodiment, printed content such as text and graphics is printed on an outer side (not labelled but including outer-right portion 215 and outer-left portion 216) while conductive lines are printed on an inner side (not labelled but including inner-right portion 204 and inner-left portion 203).

When a user touches one of areas 210A–210R, a switch closes, i.e. an electrical contact is formed between one of conductive lines 206_1-206_N and one of conductive lines 207_1-207_M. The amount of force required to close a switch in remote control 200 depends on various factors, such as the height of separators and the stiffness of material used to form separators. In one particular embodiment, a switch in remote control 200 closes on a light touch, e.g. a force between 3 oz. and 5 oz.

Therefore, a user can touch, for example, printed content in the form of the text "I LOVE LUCY" (FIG. 2B) on outer-right portion 215 in area 210K such that an electrical contact occurs in remote control 200 at a switch formed by conductive lines 206_I and 207_J. Such an electrical contact is sensed by microcontroller 104 (not shown in FIG. 2B) which causes signal transmitter 106 to transmit e.g. infrared signal 109. Although not shown in FIG. 2B, printed content in the form of text or graphics can be printed in all touch areas 210A–210R.

In this particular embodiment, battery 107 is detachably attached to paper sheet 201 and electrically coupled to microcontroller 104's pins 104I and 104O (FIGS. 2A and 2B) through holes (not shown) in inner-left portion 203 as described in the above-identified application Ser. No. 08/405,645.

It is to be understood that the above description is intended to be illustrative and not limiting. Many variations of the invention will become apparent to a person of skill in the art of designing remote controls upon review of this disclosure. For example, instead of folding a sheet of paper, two separate pieces of material (such as cardboard) can be attached to each other. Moreover, the electrical parts described above can be integrated into a substrate (such as cardboard) during formation of the substrate. Also, instead of longitudinal ridges, separators can be formed as circular protrusions, e.g. similar to bubble wrap packaging. Furthermore, separators can be formed on only one portion of a substrate instead of two portions as described above.

Numerous such modifications and adaptations are encompassed by the appended claims.

What is claimed is:

1. A remote control for remotely controlling a host device, said remote control comprising:

a printed publication having a substrate and printed content on the substrate, the printed content being at least one of text and graphics;

a circuit formed of conductive ink on the substrate and located adjacent to the printed content;

an integrated circuit die mounted on the substrate, the integrated circuit die having a signal input pin, a signal output pin, and a power pin, the signal input pin being electrically coupled to the circuit;

a signal transmitter mounted on the substrate and electrically coupled to the signal output pin by the circuit; and a battery supported by the substrate and electrically coupled by the circuit to at least the power pin.

2. The remote control of claim 1 wherein the conductive ink comprises carbon.

3. The remote control of claim 1 wherein:

the substrate is a paper sheet, and the battery is detachably attached to the paper sheet;

the circuit includes a switch;

the printed content is formed over the switch; and the integrated circuit die is embedded in the paper sheet, between two portions of the paper sheet, and is coupled to the switch so that touching the printed content closes the switch and operates the integrated circuit die.

4. The remote control of claim 1 wherein the signal transmitter includes a light emitting diode capable of transmitting an infrared signal.

5. The remote control of claim 1 wherein the substrate includes a first portion and a second portion, at least some of the conductive ink being printed on each of the second portion and the first portion, the second portion and the first portion being attached to each other by an adhesive located at a periphery of the second portion.

6. The remote control of claim 5, wherein:

at least one of the first portion and the second portion has a plurality of separators;

the conductive ink on the first portion faces the conductive ink on the second portion;

the plurality of separators keep conductive ink on the second portion physically separated from conductive ink on the first portion except when touched, and allow electrical contact between conductive ink on the second portion and conductive ink on the first portion in a touched area of the substrate, said area to be touched having the printed content; and the conductive ink on the first portion contacts conductive ink on the second portion thereby causing operation of the signal transmitter when the area to be touched is touched.

7. The remote control of claim 5 wherein the second portion and the first portion are two halves of a surface of a single integral sheet of paper, said paper being folded along center line between said two halves such that the integrated circuit die is supported between the two halves.

8. The remote control of claim 7 wherein the circuit is located on one surface and the printed content is located on another surface of the substrate.

9. The remote control of claim 5 wherein conductive ink on the second portion is formed in areas that overlap with areas of conductive ink formed on the first portion only at certain predetermined locations, thereby to form a criss-cross grid of switches coupled to the integrated circuit die.

10. The remote control of claim 9 wherein the criss-cross grid is formed in substantially all of the substrate.

11. The remote control of claim 5 wherein the circuit includes a plurality of conductive lines shaped in the form of alphabet "L".

12. The remote control of claim 11 wherein the plurality of separators include a group of longitudinal ridges that interdigitate with the plurality of conductive lines.

13. The remote control of claim 5 wherein the first portion is included in a first surface of the substrate and the substrate has a second surface carrying the printed content.

14. The remote control of claim 1 wherein the conductive ink comprises silver.

15. The remote control of claim 1 wherein:
the signal transmitter includes a second power pin and the battery is coupled by the circuit to the second power pin.

16. The remote control of claim 1 wherein:
at least a portion of the substrate is sufficiently resilient to deform elastically when touched; and
the conductive ink is sufficiently resilient to deform elastically with flexure of the portion of the substrate.

17. The remote control of claim 1 wherein the printed publication has the form of a book.

18. The remote control of claim 1 wherein the printed publication has the form of a magazine.

19. The remote control of claim 1 wherein the printed publication has the form of a postcard.

20. The remote control of claim 1 wherein the battery is located over the integrated circuit die.

21. The remote control of claim 1 wherein the battery is detachably attached to the substrate.

22. The remote control of claim 1 wherein:
the substrate includes a paper sheet;
the circuit includes a switch;
the printed content is formed on the paper sheet over the switch;
the integrated circuit die is coupled to the switch; and
the switch closes and operates the integrated circuit die when the printed content is touched.

23. The remote control of claim 1 wherein the battery is connected to the signal transmitter.

24. A method for forming a remote control comprising:
forming a plurality of lines of conductive ink on a substrate;
printing content on the substrate, the content being at least one of text and graphics; and
mounting on the substrate a plurality of electrical parts selected from a group comprising an integrated circuit die and a signal transmitter;
wherein the electrical parts are electrically interconnected by at least one of the plurality of lines on the substrate.

25. The method of claim 24 further comprising a step of folding the substrate subsequent to the steps of forming and mounting.

26. The method of claim 24 wherein the step of forming comprises printing.

27. The method of claim 24 wherein the step of forming comprises screening.

28. The method of claim 24 further comprising a step of forming a plurality of separators on the substrate.

29. The method of claim 28 wherein the step of forming separators comprises printing a dielectric ink at locations interdigitated with locations of said plurality of lines.

30. The method of claim 24 further comprising a step of detachably attaching a battery to the substrate such that the battery supplies power to the integrated circuit die and to the signal transmitter.

31. The method for claim 24 wherein the step of mounting comprises use of a flip chip assembly.

32. The method of claim 24 wherein the plurality of lines include a switch located opposite to the printed content, and the method further comprises:
touching the printed content to close the switch.

33. The method of claim 24 wherein the conductive lines are formed in substantially all of the substrate.

* * * * *